United States Patent Office 2,964,394
Patented Dec. 13, 1960

2,964,394

AMMONIATION OF SUPERPHOSPHATES

John Harris Haslam, Landenberg, Pa., assignor to E. I. du Pont de Nemours and Company, Wilmington, Del., a corporation of Delaware No Drawing. Filed Jan. 31, 1958, Ser. No. 712,320

1 Claim. (Cl. 71—42)

This invention relates to a composition and process for the ammoniation of acidic fertilizer materials, and particularly to a process for ammoniation of superphosphate fertilizers in the presence of an ingredient which suppresses reversion of calcium phosphates to citrate insoluble forms.

It is known that acidic fertilizer materials, particularly superphosphate, may react with liquid ammoniating agents such as anhydrous ammonia or aqua ammonia, or ammoniacal solutions of nitrogenous fertilizer materials such as urea, ammonium nitrate, or the like to produce improved fertilizers containing available phosphorus and nitrogen. The ammoniation reactions between the free ammonia and acidic components are accompanied by a rise in the temperature of the reaction mixture, and this temperature rise frequently causes or accelerates undesirable reactions resulting in the partial reversion of readily soluble phosphatic compounds to bodies of lower plant food availability. Moreover, upon storage of the product, especially at elevated temperatures, reversion tends to occur. Many methods have been devised for controlling or preventing this reversion. Thus, in some instances the reaction is carried out in the presence of a liquid phase, which tends to prevent excessive localized over-heating. Also, cooling machinery is frequently employed as disclosed in U.S. Patent 2,305,078, to control the ammoniation temperature. Another method, disclosed in U.S. Patent 2,279,200, is to employ hexamethylene tetramine in combinatiton with urea as a non-exothermic ammoniating agent. Still another method is to have present in the ammoniating mixture an endothermic ammoniating agent, such as ammonium bicarbonate, as disclosed in U.S. Patents 2,415,464 and 2,439,432.

An object of this invention is to provide an improved process for ammoniation of acidic fertilizers whereby the reversion hereinabove mentioned is suppressed. Another object is to provide an improved ammoniating agent. A still further object is to provide an ammoniating agent by means of which ammoniation can be carried to a much greater extent than has been possible heretofore, except where reversion was excessive.

These and other objects are accomplished in accordance with this invention by employing in the ammoniation of acidic fertilizers, e.g. superphosphate, an ammoniating agent containing a member of the class consisting of alkali metal hydroxyacetates, ammonium hydroxyacetate and hydroxyacetic acid. The ammoniated superphosphates prepared in accordance with this invention contain less insoluble phosphate than does ammoniated superphosphate prepared with the same ammoniating agent in the absence of the hydroxyacetic component.

In the ammoniation of superphosphate, it has been customary to introduce about 25 to 40 parts of ammonia by weight per 1000 parts of superphosphate. This corresponds to about 1–1.6 moles of ammonia per mole of $P_2O_5$. Larger amounts are not generally introduced since this results in reversion, i.e. conversion to tricalcium phosphate or other citrate insoluble form. When the ammoniation is carried out by the method of this invention, approximately 60 parts of ammonia or more are readily introduced per 1000 parts of superphosphate. The calcium phosphate in the products obtained in the practice of this invention has superior plant food availability than does the calcium phosphate in products similarly made in the absence of the hydroxyacetate.

Reversion of soluble phosphates available as plant nutrients to insoluble phosphates unavailable as plant food is increased by the following:

(1) Higher degrees of ammoniation.
(2) Higher temperatures.
(3) Longer time (especially at high temperatures).
(4) Higher water content.

By the use of this invention these factors are less detrimental. Higher ammoniation rates can be used without excessive reversion, and less control in the ammoniation process is necessary since even higher temperatures for considerable times do not effect extensive reversion of the phosphate. Control of water content also becomes less critical since a considerable amount of water can be tolerated without reversion, in the process of the present invention.

In the ammoniation of ordinary superphosphate by the process of this invention, the ammoniation operation can be performed in various ways, such as by the use of a mechanical mixer, which may or may not be equipped with cooling means. The temperature is generally within the range of 20° F. to 250° F., preferably 80° F. to 150° F. Even at temperatures above 150° F., the practice of the invention is highly advantageous because of the suppression of the reversion which would normally occur at these temperatures. Cooling thus becomes less important as a method of controlling reversion, when the composition of this invention is used.

The effect of the hydroxyacetic component is far greater than the effect of sulfuric acid, or other previously employed acids, in suppressing reversion.

Among the agents which may be used in combination with the ammonium hydroxyacetate in ammoniation of superphosphate in accordance with this invention are the following: urea-ammonium mixtures, ammonia, ammonium nitrate-ammonia, ammonium sulfate-ammonia, ammonium carbamate-urea-ammonia, and urea-ammonia-hexamethylene tetramine. In one embodiment of the invention, ammonium hydroxy acetate is formed in situ, by reaction between hydroxyacetic acid (which may be added as such or formed from an added hydroxyacetate salt, such as sodium hydroxyacetate) and ammonia. Potassium hydroxyacetate is produced to some extent by metathesis when potassium chloride and hydroxyacetic acid are added, under ammoniation conditions.

In a specific embodiment, superphosphate is admixed with about 1 to 6% of ammonia (preferably dissolved in water in the form of a concentrated solution), and a weight of hydroxyacetate equal to between 0.05 to 3 times the weight of ammonia.

The following examples will serve further to describe this invention.

*Example 1*

In a rotating drum having good mixing action 200 parts by weight of commercial superphosphate (20% $P_2O_5$ content) was placed. Ten parts by weight of hydroxyacetic acid dissolved in 10 parts by weight of water were sprayed into the superphosphate and the mixture was tumbled for 10 minutes. Ammoniation of this mixture was then carried out by spraying into the rotating drum 12 parts by weight of anhydrous ammonia. This mixture was further tumbled for 10 minutes, whereupon it was bottled and placed in an oven with the temperature controlled at 150° F. for a period of 7 days. At the end of this time the mixture was analyzed for insoluble phosphates using the A.O.A.C. method (1955, 8th ed., 2.18). The amount of insoluble phosphate calculated as $P_2O_5$ was 0.37 and 0.46%, respectively, in two samples.

For purpose of comparison the ammoniation was similarly carried out omitting the hydroxyacetic acid. The sample was stored at the same time and at the same temperature. The amount of insoluble phosphate calculated as $P_2O_5$ by the above A.O.A.C. method was 2.2 and 2.5%. The hydroxyacetic acid effected an 82% reduction in this reversion.

*Example 2*

When the procedure of Example 1 was carried out with the same quantities of materials and at the same conditions except that the ammonia and hydroxyacetic acid solution were premixed before spraying into the rotating drum, the reduction in reversion was 61%.

*Example 3*

When the procedure of Example 1 was carried out at a temperature of 150° F. with various proportions of hydroxyacetic acid based on the superphosphate, reductions in reversion were obtained as follows:

| Hydroxyacetic acid, percent based on superphosphate | Reduction in reversion (A.O.A.C. method), percent |
|---|---|
| 0.5 | 37 |
| 2.5 | 57 |
| 5.0 | 70 |

*Example 4*

To demonstrate that the effectiveness of hydroxyacetic acid is not entirely due to its action as an acid in reacting with a part of the ammonia and thus reducing the degree of ammoniation of the superphosphate, the following experiments were carried out. In a control experiment two hundred parts of superphosphate were ammoniated with a solution of 12 parts of ammonia in 10 parts of water according to the procedure described in Example 1. After storage at 150° F. for 7 days, the citrate insoluble phosphate (calculated as $P_2O_5$ was 2.10%. In a companion run 10 parts of crude hydroxyacetic acid was added. Additional ammonia (2.2 parts) was added to compensate for the acidity of the hydroxyacetic acid making a total of 14.2 parts of ammonia added to the superphosphate. Again 10 parts of water was used. After 7 days' storage at 150° F. the citrate insoluble phosphate was 0.25%. This was an 88% reduction from the control without hydroxyacetic acid.

*Example 5*

A mixed fertilizer of 5-10-10 grade (5% N, 10% $P_2O_5$, 10% $K_2O$) was made up as follows: Five hundred parts of superphosphate, 167 parts of KCl and 224 parts of sand were tumbled together and ammoniated with 110 parts of "UAL"-B, a commercial ammoniating liquor consisting of urea, ammonium carbamate, ammonia and water. After mixing for 10 minutes, the material was bottled and stored for 7 days at 150° F. The citrate insoluble phosphate (as $P_2O$) was 1.23%.

In another run the same components were mixed except in this case the "UAL"-B contained 5.5 parts of hydroxyacetic acid in addition to the regular components. After storage for 7 days at 150° F., the citrate insoluble phosphate (as $P_2O_5$) was 0.52%, a reduction of 58%.

*Example 6*

The effectiveness of hydroxyacetic acid in preventing reversion of triple superphosphate at very high ammoniation rates (8.4%) was determined. One hundred parts of triple superphosphate was ammoniated with a solution of 8.4 parts of ammonia in 10 parts of water by the procedure described in Example 1. After storage at 150° F. for 7 days, the citrate insoluble phosphate (as $P_2O_5$) was 5.16%.

In a companion run 100 parts of triple superphosphate was ammoniated with a solution consisting of 5 parts of crude hydroxyacetic acid, 10 parts of water and 9.5 parts of ammonia (1.1 parts extra being added to leave 8.4 parts of free ammonia after the hydroxyacetic acid had been neutralized). After storage at 150° F. for 7 days, the citrate insoluble phosphate was 2.79%, a 46% reduction from the control.

*Example 7*

One hundred parts of superphosphate were ammoniated in a rotating tumbler with ammonia both with and without hydroxyacetic acid added. In each case 10 parts of water were used. The quantity of ammonia added in each instance is recorded in the following table. When hydroxyacetic acid was used, 5 parts were added and an equivalent additional amount of ammonia (1.1 parts) to neutralize it were added to maintain the free ammonia at the equivalent level with the control. The mixtures thus obtained were bottled and stored as stated in the table, i.e. one set was stored 1 week at 110° F. and another set was stored 1 week at 150° F.

The results were as follows:

PERCENT INSOLUBLE $P_2O_5$ FORMED ON STORAGE

| Extent of Ammoniations [1] | Stored 7 days at 110° F. | | Stored 7 days at 150° F. | |
|---|---|---|---|---|
| | No hydroxyacetic acid | 5 pts. hydroxyacetic acid | No hydroxyacetic acid | 5 pts. hydroxyacetic acid |
| 3 | | 0.26 | 0.24 | 0.44 |
| 4 | 0.73 | 0.14 | 1.52 | 0.36 |
| 5 | 0.46 | 0.22 | 1.80 | 0.99 |
| 6 | 0.47 | 0.19 | 2.14 | 1.30 |
| 7 | 0.53 | 0.32 | 2.20 | 1.46 |

[1] Parts $NH_3$ per 100 parts of superphosphate introduced other than that required for neutralizing the hydroxyacetic acid.

The procedures described in the foregoing Examples can be modified as will be apparent to persons skilled in the art. Thus hydroxyacetic acid may be present initially with the superphosphate or added with the ammoniating agent. In the latter situation the conversion of hydroxyacetic acid to ammonium salt may occur prior to the ammoniation reaction, and the acid of the superphosphate may cause release of hydroxyacetic acid in the free state. It is not essential to control the conversion of salt to hydroxyacetic acid or acid to salt since both are highly effective as agents which suppress reversion.

The superphosphates which may be used in accordance with this invention include the ordinary superphosphate of commerce, or other superphosphates made from rock phosphate and mineral acid, preferably superphosphates containing 15 to 50% available $P_2O_5$.

The ammoniation of superphosphate as described above may be conducted in any suitable mixing equipment, such as a conventional mixing drum equipped with means for control of temperature.

What is claimed is the following:

A process for ammoniation of superphosphate which comprises contacting superphosphate with from about 1% to 6% by weight of ammonia, and an ingredient from the class consisting of alkali metal hydroxyacetates and ammonium hydroxyacetate, said ingredient being present in an amount by weight of from 0.05 to 3 times the weight of the ammonia.

References Cited in the file of this patent

UNITED STATES PATENTS

| 1,948,520 | Harvey | Feb. 27, 1934 |
| 2,393,086 | Bousquet | Jan. 15, 1946 |
| 2,739,054 | Andres et al. | Mar. 20, 1956 |